United States Patent [19]
Schaefer

[11] 3,811,470
[45] May 21, 1974

[54] FLUID CONTROL DEVICE
[76] Inventor: John W. Schaefer, 1228 Manitou, McHenry, Ill. 60050
[22] Filed: Dec. 15, 1971
[21] Appl. No.: 208,101

Related U.S. Application Data
[63] Continuation-in-part of Ser. No. 148,400, June 1, 1971.

[52] U.S. Cl......... 137/540, 137/515.7, 137/516.29, 251/333
[51] Int. Cl............................................. F16k 15/06
[58] Field of Search....... 137/515.7, 516.29, 533.17, 137/540, 542, 543, 543.21; 251/333

[56] References Cited
UNITED STATES PATENTS

| | | | |
|---|---|---|---|
| 2,673,062 | 3/1954 | Cornelius | 137/540 |
| 2,745,432 | 5/1956 | Williams | 137/540 |
| 2,870,784 | 1/1959 | Walls | 137/515.7 X |
| 1,733,180 | 10/1929 | Biederman | 251/333 X |
| 3,086,544 | 4/1963 | Yost | 137/540 X |
| 2,666,448 | 1/1954 | Garretson et al. | 137/540 |
| 3,417,778 | 12/1968 | Ratelband | 251/333 X |
| 3,559,678 | 2/1971 | Donner | 137/543.23 X |

Primary Examiner—Robert G. Nilson
Attorney, Agent, or Firm—Roy E. Petherbridge; Robert L. Lindgren; Edward D. Gilhooly

[57] ABSTRACT

A fluid control valve for allowing free flow of fluid in one direction in a fluid line and the restriction or metering of the flow in the opposite direction. The control valve includes a low inertia poppet which is biased into contact with a deformable valve seat for selective movement relative thereto in accordance with the pressure condition within the fluid line in which the valve is connected. One form of the invention the check valve permits free flow in one direction with a minimum of pressure drop but which completely restrict the flow in the opposite direction. Other embodiments of the fluid control valve possess a return metering member which permits the free flow of liquid in one direction but meters the amount of flow in the opposite direction at a desired rate. The metering member is selectively controllable from the exterior of the control valve body.

7 Claims, 9 Drawing Figures

INVENTOR.
JOHN W. SCHAEFER
BY Petherbridge, O'Neill & Lindgren
ATTORNEYS.

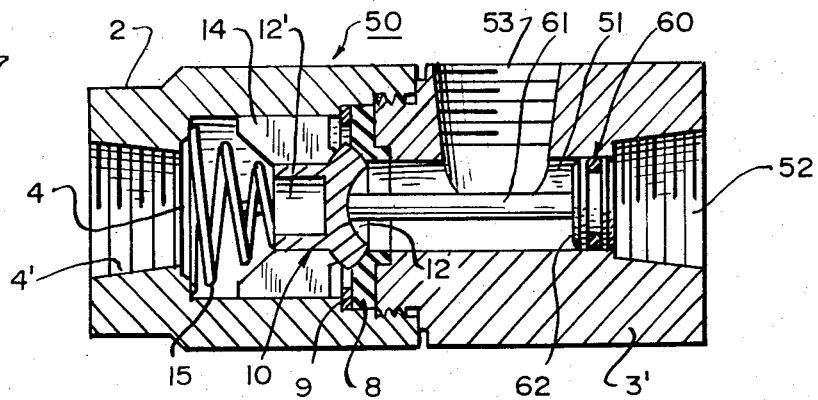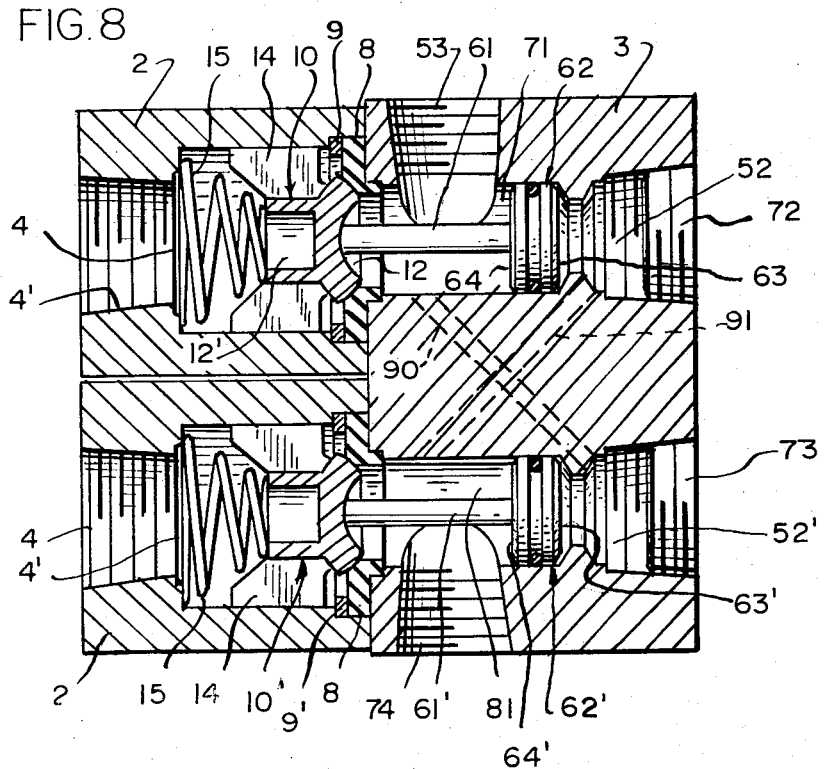

FLUID CONTROL DEVICE

This application is a Continuation-In-Part of my earlier co-pending application, Ser. No. 148,400 filed June 1, 1971.

BACKGROUND OF THE INVENTION

This invention relates in general to fluid control devices and in particular to a novel fluid control valve.

More specifically, the invention relates to a control valve which permits free fluid flow in one direction and controls the flow in the opposite direction by preventing all flow or metering of the flow. The novel fluid control valve of the invention includes a low inertia poppet member which is spring biased into contact with a deformable valve seat which creates an improved seating of a valve member. Metering of the return flow in the fluid in the valve of the invention is selectively controlled from the exterior of the valve by various techniques.

In many hydraulic or pneumatic fluid systems, it is sometimes necessary that a fluid line thereof achieves free flow in one direction while the flow in the opposite direction be restricted or limited. In the prior art, numerous check valves and other type flow control elements have been utilized to achieve this desired control of fluid passing through the line of a hydraulic or pneumatic fluid system. Although many of these valves achieve free flow in one direction and control of the flow in the opposite direction, many prior art designs are deficient in several aspects. For example, numerous prior art techniques do not achieve a truly free flow of fluid in one direction since the design of these valves creates an undesirable pressure drop therethrough. Moreover, previous valves tend to be slow in response to the various pressure conditions present in the fluid system. The response problems of prior art valves have been created in part by the relatively high inertia of the poppet element. Also, the contact between the poppet and valve seat in many known valves has been found to be ineffective to create leakage as well as poor wear of the elements.

Many other problems are found to exist in prior art check valve devices such as the tendency of some of the valves to clog when the valve is in open position. It is also important that the valving element does not create turbulence within the flow when the poppet is open which also reduces the efficiency of the device. Such a open which is associated with some prior art valving devices. Heretofore, readily deformable valve seats were short lived in high pressure applications due to extrusion of the valve seat. The improved fluid control valve of the invention overcomes this foregoing problem of the prior art devices. Therefore, it is desirable to provide an inexpensive and readily manufactured control valve which overcomes the afore-mentioned problems and others which are associated with numerous prior art valving devices.

SUMMARY OF THE INVENTION

It is, therefore, an object of this invention to improve fluid control devices.

Another object of this invention is to reduce the cost for manufacturing an effective fluid control valve.

A further object of this invention is to effectively allow free flow in one direction of a fluid line and to control the flow in the opposite direction.

Still another object of this invention is to increase the response of a control valve in accordance with encountered pressure conditions.

These and other objects are attained in accordance with the present invention wherein there is provided a fluid control valve that effectively allows free flow in one direction through a fluid line and control of the flow of fluid in the opposite direction in the fluid line. One embodiment of the invention includes a novel poppet element spring biased in contact with a deformable valve seat element whereupon the poppet rapidly responds to a threshold pressure in order to effect free flow of the fluid through the control valve. The use of a deformable type valve seat element and the particular design of the poppet of the invention allow the elements to efficiently contact in a closed position to improve the valving characteristics of the device. Further, the use of a deformable valve seat reduces clogging of the valve in an open position and the wear characteristics of the element are significantly improved. The design of the poppet of the invention creates a minimum of turbulence to reduce the pressure loss through the device. The relatively simple design of the valve provides a device which is readily repaired when necessary with a minimum of expense. In other embodiments of the invention, the above advantages are attained along with a metering of the flow in one direction. The control valve of the invention achieves the improved results herein disclosed with a device which is long-lasting in operation and inexpensive to manufacture.

DESCRIPTION OF THE DRAWINGS

Further objects of the invention together with additional features contributing thereto and advantages accruing therefrom will be apparent from the following description of several embodiments of the invention when read in conjunction with the accompanying drawings wherein:

FIG. 7 is a side sectional schematic illustration of another embodiment of the fluid control valve of the invention.

FIG. 8 is another embodiment of the fluid control valve of the invention.

DESCRIPTION OF THE PREFERRED EMBODIMENTS

Figure 1:
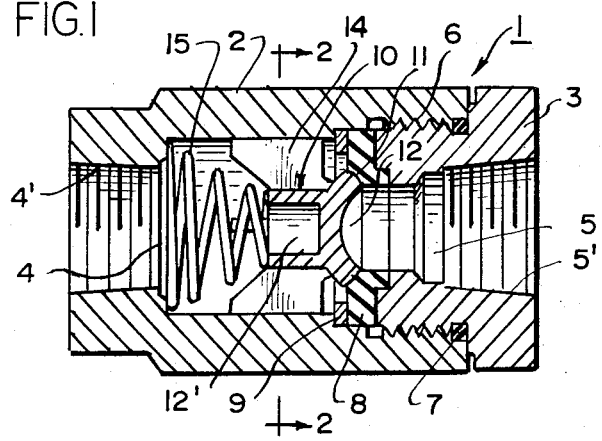
FIG. 1 is a side sectional schematic illustration of one embodiment of the fluid control valve of the invention.
Figure 2:
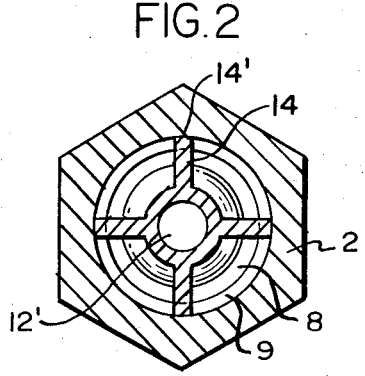
FIG. 2 is a sectional end view of the fluid control valve taken along line 2—2 of FIG. 1.

Referring now to FIGS. 1 and 2, there is illustrated one embodiment of the fluid control valve of the invention. The fluid control valve 1, shown in FIG. 1, is a control device for effecting free flow of the fluid in one direction and completely stopping the flow in the opposite direction through a check valve mechanism. Control valve 1 includes a housing having a tubular shell 2 and a seat support 3. A flow passage is provided through the housing by passage 4 provided in tubular shell 2 and passage 5 extending through seat support 3. To secure the control valve 1 in a fluid line, each of the passages 4 and 5 includes respective threaded opening 4' and 5'. The parts of the two piece housing may be constructed of any suitable material such as metal, plastic and the like. The shell 2 and seat support 3 are interconnected at one end through the use of complementary threaded elements 6 wherein a conventional sealing O-ring element 7 is situated adjacent thereto.

Seat support 3 includes an end surface which supports a valve seat 8 which is biased against seat support 3 by use of element 9 positioned in a notch of housing 2 to bias valve seat against the seat support. The inner edge 11 of valve seat 9 located opposite to the seat support 3 is formed with a curvature in order to cooperate with a poppet element 10 in a manner to be described in detail later. Seat 8 preferably is formed with a deformable material such as a polyurethane plastic or neoprene.

Poppet element 10 is shown in a closed position in FIG. 1 wherein curvature 11 of the poppet member is in contact with the curvature of valve seat 8 in order that line contact may occur between the valve seat and poppet when in a closed position under low back pressures or curved contact under high pressures. The rest of the poppet member includes a leading edge portion having concave area 12 and a body portion formed with an opening 12' to reduce the weight of the element. The body of poppet 10 may be constructed of any suitably light material such as, for example, an aluminum or a molded plastic. A plurality of integral vanes 14 extend radially from the body of the poppet and extend at their outer edges into sliding contact along the interior wall of tubular housing 2. From the foregoing, it should be apparent that the vanes 14 center and maintain poppet element in the proper position relative to the valve seat and the length of the vanes is less than the flow passage to permit the poppet to slide relative to the interior of the housing.

A spring 15 is interposed between the end of poppet 10 and an internally positioned spring seat provided in tubular housing 2 adjacent opening 4'. Spring 15 is selected to have a resilience to bias poppet 10 against valve seat 8 until a threshold pressure is achieved in conduit 5 to move the poppet from the seat. In view of the novel light weight design of the poppet member, the response of poppet 10 to the threshold pressure being introduced in opening 5' is rapid and effective. Besides maintaining poppet 10 in the proper position, vanes 14 prevent turbulence and thus the pressure drop through the valve 1 is minimized.

Other advantages are found to accrue from the deformable valve seat provided in the valve of the invention since either line contact between the two elements is achieved under low pressure for more effective sealing or under high pressure the deformable element achieves area contact with two radii to permit the valve to operate efficiently under either high or low pressure. It has also been found that the deformable valve seat achieves improved wear characteristics and prevents clogging when poppet 10 is in an open position. Thus, it should be apparent that the check valve of FIG. 1 achieves a free flow in one direction to the valve with a rapid response to a threshold pressure and prevents flow from occurring in the opposite direction.

Figure 3:
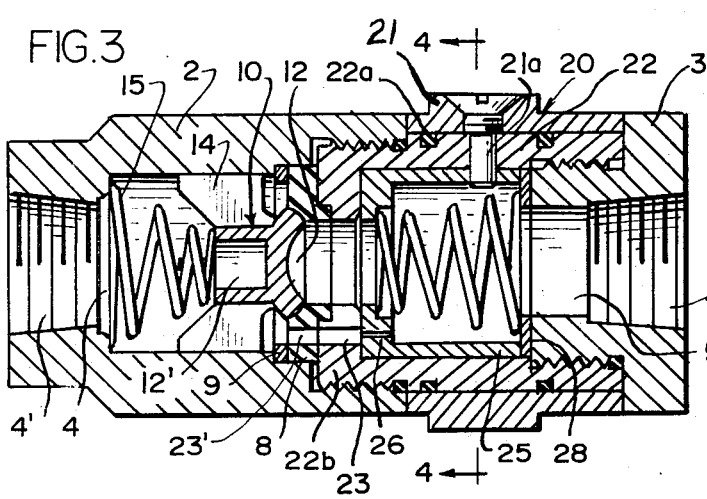
FIG. 3 is a side sectional schematic illustration of another embodiment of the fluid control valve of the invention.
Figure 4:
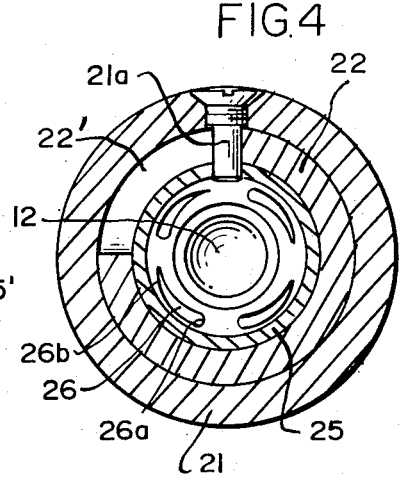
FIG. 4 is a sectional end illustration taken along line 4—4 of FIG. 3.

Referring now to FIGS. 3 and 4, there is illustrated another embodiment of the fluid control valve of the invention. Fluid control valve of FIG. 3 is essentially identical to the check valve of FIG. 1 except that interposed between housing 2 and seat support 3 is a reverse flow metering mechanism 20. The reverse flow metering mechanism 20 includes an adjusting ring 21 surrounding a meter thrust shell 22 wherein the meter thrust shell interengage interior threads on tubular housing 2 and exterior threads on the seat support 3 in a sealing relationship by the use of conventional O-rings. A deformable valve seat 8 similar to that described in reference to the embodiment in FIG. 1 is positioned on an end of meter thrust shell 22 as similarly accomplished by the use of seat support 3 of FIG. 1. A metering drive pin 21a is inserted radially into the meter body through adjusting ring 21 into a slot 22' formed in meter thrust shell 22 as shown in FIG. 4. Slot 22' extends for an arc of approximately 90 degrees, although other angles may be selected according to desired results. It should be apparent from the foregoing that rotational movement of adjusting ring 21 relative to meter thrust shell 22 is possible because of slot 22'. To insure that the slot is properly sealed, a pair of conventional O-rings 22a are positioned adjacent the side of the slot 22'.

Meter thrust shell 22 has a plurality of orifices 23 through end surface 22b which are in fluid communication with a corresponding orifice 23' formed in meter plate 8. Mounted on the opposite side from meter plate 8 and bearing against meter thrust shell 22 is a metering plate 25 having a tubular portion 25' circumferentially positioned within tubular thrust member 22. A series of non-uniform orifices 26 are created through meter plate 26 at a radial location corresponding to the location of the fixed orifice 8' and 23 wherein orifices 26 have a greater area at one end thereof than the other. Therefore, it is possible to regulate the amount of liquid passing through the metering mechanism by rotating metering plate 25 relative to fixed orifice 23 formed in the meter thrust shell 22.

Viewing FIG. 4, it can be seen that the maximum flow area selected is derived by aligning portion 26a of the orifices 26 with the fixed orifice 23 or if a minimum flow or no flow is desired aligning end 26b or the area between adjacent orifice with the fixed orifices. To accomplish the movement of plate 25 relative to orifice 23 and 8', drive pin 21a is secured to the tubular wall of the meter plate 25 whereby rotation of ring 21 through the slot 22' formed in the thrust shell 22' reflects relative movement between orifice 3 and the metering plate. Therefore, by selecting the alignment of the orifice 26 with respect to orifice 23, a desired back flow through the valving element is accomplished while poppet 10 is closed.

The particular number of orifices 8' and 23' utilized is dependent upon the number of slots 26 formed in thrust meter plate 25. A spring 27 extends between the meter plate and a thrust bearing 28 mounted at the end of member 3 to bias the meter plate against the end of the meter shell.

In operation, the control valve of FIGS. 3 and 4, achieves a free flow of fluid in one direction as accomplished in the embodiment described with reference to FIG. 1. The opening of poppet 10 from the metering plate is dependent upon a threshold pressure which is derived from the spring force 15 biasing poppet 10 against the meter plate. However, when the pressure in conduit 5 is less than the threshold pressure, the valve closes and a metered back flow is provided through the metering mechanism 20. The back flow passes through orifices 8' and 23 and through the orifice formed in meter plate 25. The amount of metered flow passing from passage 4 to passage 5 is dependent upon the relative position of the non-uniform orifices 26 with respect to the orifice 23. If no flow is desired to be passed, the space between adjacent orifices 26 is aligned with the orifice 23 formed in meter thrust shell 22.

Figure 5:
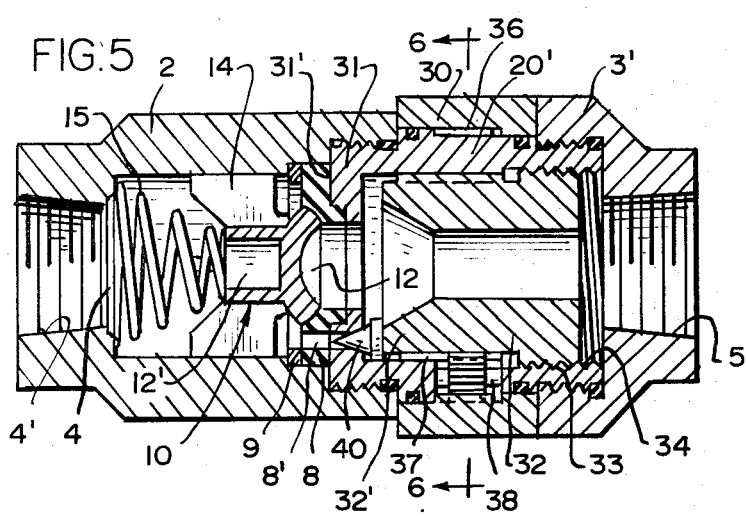
FIG. 5 is a side sectional schematic illustration of still another embodiment of the fluid control valve of the invention.
Figure 6:
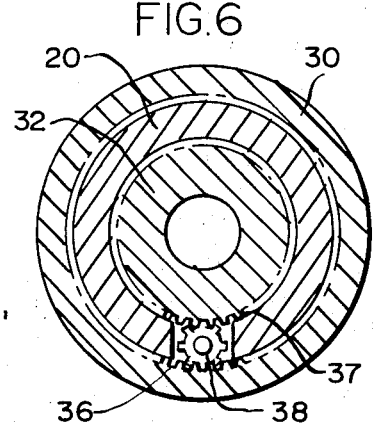
FIG. 6 is an end sectional illustration taken along line 6—6 of FIG. 5.

Referring now to FIGS. 5 and 6 there is illustrated another embodiment of the fluid control valve of the present invention. The embodiment of FIGS. 5 and 6 utilizes a poppet valve and valve seat designed for effecting free flow in one direction through the valve similar to that described with reference to FIG. 1. Interposed between the tubular housing 2 and an end housing piece 3' is a back flow metering mechanism 20' for selectively metering the return flow upon poppet 10 being positioned in a closed position. Return flow meter mechanism 20' includes a knurled ring 30 which concentrically surrounds a tubular thrust member 31 that in turn supports a deformable valve seat 8 on an end surface 31' adjacent poppet 10. Tubular member 31 includes external threads mounted at one end for complementary securement with tubular housing 2 and outer disposed threads at the other end which engage complimentary internal threads of end member 3 of the valve body. An adjustment ring 32 is mounted within the member 31 having a tapered end 32' and a radial projection at the other end which includes external threads 33 which engage complementary threads 34 formed within the interior wall of tubular member 31. The length of threads 33 is less than threads 34 so that the adjustment ring is capable of longitudinal movement relative to tubular member 31 upon relative rotation therebetween.

To accomplish the longitudinal movement of the adjustment ring 32, a pinion 35 is positioned within a slot formed in member 31 and engages teeth 36 provided on the interior surface of knurled ring 30 and teeth 37 formed along a portion of the exterior surface ring 32. Pinion 35 includes trunnion ends 38 supported in inner member 31 in smaller end portions of the slot thereof. Thus, rotation of knurled ring 30 of inner member 31 rotates pinion 35 adjustment ring 32 to effect longitudinal movement of ring 32 relative to inner member 31 through the cooperative function of threads 34 and 35.

A free needle valve 40 is located at the end of the adjustment ring 32 adjacent an orifice 8' formed through valve seat 8 and an end flange of inner member 31. The longitudinal movement of the adjustment ring establishes the seating of the needle 40 with respect to the orifice 8' thus metering the amount of back flow upon poppet 10 being closed.

Referring now to FIG. 7, there is illustrated another embodiment of the fluid control valve of the invention. The embodiment illustrated in FIG. 7 comprises a protection circuit for use in fluid systems. The protection circuit of FIG. 7 includes a fluid check valve substantially identical in construction to that described with reference to the embodiment of FIG. 1. Essentially, the difference between the check valve of FIG. 1 and FIG. 7 exists in a modification of valve seat support housing 3' and the utilization of a pilot control element 60 in conjunction with poppet 10 wherein housing 3' includes a central passage 51 and an inlet 52 provided on an end thereof.

A second inlet opening 53 is provided laterally through housing 3' in communication with central flow passage 51 and is adapted to be coupled to flow conduit means (not shown) introducing an inlet flow into the control valve device of FIG. 7. Therefore, the flow passes through the control valve by entering inlet 53 into flow passage in confrontation with poppet 10. An elongated stem member 61 is coupled to poppet 10 and extends axially through flow passage 51 to a point adjacent inlet 52. A conventional spool member 62 is attached to the end of stem 61 adjacent the inlet port 52 and is designed to act as a piston member in a sliding relationship with flow passage 51. Fluid port 52 is adapted to be connected by a fluid coupling means (not shown) to any suitable pressure source which is utilized in hydraulic applications.

Upon the pressure source introduced into inlet 51 reaching a level sufficient to overcome the biasing force of spring 15 against poppet 10 flow between inlet 53 and outlet 4 occurs since the spool is moved by the pressure force to the left to unseat poppet 10 from valve seat 8. Therefore, the protection circuit of FIG. 7 allows flow to occur and unseating of the poppet to be achieved when a desired pressure level in a fluid system occurs. Although the inlet 52 may be coupled to a third source of pressure other than the inlet pressure entering inlet 53, it should be apparent that the fluid line coupled to inlet port 52 may be coupled upstream of inlet 53 to thus allow the pressure upstream of the control valve to control opening and closing of the check valve. In either case, upon the pressure times area value being exerted against spool 61 through inlet 52 becoming less than the spring force of the spring 15, poppet 10 then moves to a seating position to discontinue flow therethrough. Thus, the control of poppet 10 in the embodiment of FIG. 7 is achieved through the use of a pilot operated poppet which is responsive to any desired pressure to perform the function of a protection circuit or other suitable application.

Referring now to FIG. 8, there is illustrated another embodiment of the control valve of the invention. The control valve illustrated in FIG. 8 may also be used as a protection type hydraulic system. The embodiment of FIG. 8 includes two interconnecting housing sections 2 and 3' having two longitudinal extending upper and lower flow passages 71 and 81 and a check valve as illustrated in FIG. 7 being positioned in each of the respective flow passages. The check valve contained in each individual flow passage is identical to that described with reference to FIG. 7, with the exception that spool 62 is constructed with a face having an effective exposed area 63 which is slightly larger than the effective exposed area of poppet 10. Inlet ports 52 and 52' are provided at one end of housing 3 in respective alignment with flow passages 71 and 81, and each inlet includes a plug member 72 and 73 whereby each of inlets is blocked. The inlet flow to the control device of FIG. 8 enters at inlet 53 provided laterally through housing 3'. Outlet 41 downstream of the upper poppet 10 is coupled by a fluid line (not shown) to inlet 41' which communicates with the lower flow passage 81 and enters at the back of a poppet 10' of the lower check valve. Outlet 74 in fluid communication with flow passage 81 is provided at the bottom of the control device and is adapted to conduct flow from the fluid circuit illustrated in FIG. 8.

Interposed between the upper and lower flow passages 71 and 81 is a first conduit 90 having a small diameter which effects fluid communication from conduit 71 adjacent face 64 of upper spool 62 to a point adjacent the opposite face 63 of the lower spool 62'. Moreover, a second flow passage 91 is provided between the two flow pasages and extends from adjacent the other face 63 of upper spool 62 to a point adjacent the face 64' of the lower spool. Therefore, it should be apparent that fluid communication is provided adjacent opposite faces of the respective upper and lower spools of the control device.

In operation of the embodiment of FIG. 8, upon the pressure in lower passage 81 achieving a value to exert a sufficient pressure against face 63 of upper spool 62 to cause upper spool 62 to move to the left as viewing FIG. 8 to open poppet 10, a flow is created from inlet 53 through the upper check valve to exit at outlet 40. This flow is introduced to the lower check valve through inlet 41' of passage 81. Since the pressure in upper passage 71 is in communication to the opposite side 63 of lower spool 62' which possesses a larger effective exposed area than the effective area of the poppet 10 and the strength of spring 15, the lower poppet 10' is unseated to create flow through the system.

If pressure is reduced, for example, downstream of the second check valve, the pressure communicated to upper spool is reduced to a point whereby the spring biases the upper poppet 10 into a closed seated position on valve seat 8 to discontinue flow. Similarly, if the pressure entering inlet 53 is undesirably reduced, the pressure communicated to the lower spool is of a level to cause the lower poppet to close and thereby also prevent flow from passing through the safety circuit. Thus, the pressure passing through the protection circuit of FIG. 8 is maintained within reasonable pressure limits. Various other pressure control applications may be achieved in a similar manner in the embodiment of FIG. 8. Although specifically not shown, the upper outlet 41 and lower inlet 41' can be coupled to opposite sides of a hydraulic cylinder apparatus in a manner so that flow reversal occurs in the control system of FIG. 8 which may in turn control the frequency of movement of a piston within the hydraulic cylinder.

Figure 9:
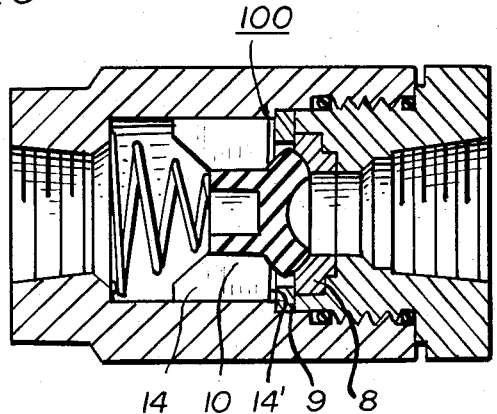
FIG. 9 is still another embodiment of the fluid control valve of the invention.

Referring now to FIG. 9, there is illustrated still another embodiment of the fluid control valve of the invention. Fluid control valve 1' is shown as a control device for effecting the free flow of the fluid in one direction and completely stopping the flow of fluid in another direction through a mechanism. The embodiment of FIG. 9 is similar to the embodiment of the fluid control valve described with reference to FIGS. 1 and 2. Under normal pressure conditions, poppet element 10 of the embodiment of FIGS. 1 and 2 bears against valve seat 8 with a degree of deformation of the valve seat dependent on the pressure differentials encountered, the particular material of the valve seat 8, the biasing strength of spring 15. As described with reference to the embodiment of FIGS. 1 and 2, the biasing of the poppet 10 against valve seat 8 in a closed position can cause a variety of shapes of deformation of the seat 8.

However, under significantly high pressure conditions, there has been found that detrimental deforming of certain deformable materials utilized as valve seat 8 can be encountered which may result in undesirable leakage of pressure past the valve. The control valve 1' of the embodiment of FIG. 9 includes a limiting means 100 which produces a predetermined and selected degree of maximum deformation of valve seat 8 as, for example, in when extremely high pressures are encountered by the check valve or other conditions. Limiting means 100 is provided by selecting a distance "X" between leading edge 14' of vanes 14 of poppet 10 and the front edge of washer element 9 which bears against one side of valve seat 8 which under predetermined pressure results in desired deformation of poppet 10 when in a closed position. As higher pressures or similar conditions are encountered, movement of poppet 10 toward valve seat 8 creates greater deformation of seat 8 until edge 14' of vane 14 washer element 9 to prevent any further movement of the poppet. Thus a limit or stop is provided to select the maximum deformation of valve seat 8 to permit useful operation of the valve under high pressures. The limit means 100 of FIG. 9 can also be incorporated in the other embodiment of the application, if desired.

Although the invention has been described with reference to preferred embodiments, it will be understood by those skilled in the art that various changes may be made and that the equivalents may be substituted for the elements thereof without departing from the true spirit of the scope of the invention. In addition, many modifications may be made to adapt a particular situation or material to the teaching of the invention without departing from its essential teaching.

I claim:

1. A fluid flow control valve for permitting free fluid flow in one direction at a threshold pressure and for stopping return flow in the opposite direction comprising a first valve body element having a passage means therethrough, the passage means having a fluid inlet opening and a fluid outlet opening, a second valve body element having a passage therethrough, the passage means of said second valve body element having a fluid outlet opening and a fluid inlet opening, means for securing the first valve body element to the second body element in fluid tight engagement, the fluid outlet opening of one of the body elements being disposed adjacent to and in communication with the fluid inlet opening of the other body element to provide a substantially continuous fluid flow passage therethrough, a deformable valve seat member having a fluid flow passage therethrough secured between the valve body elements adjacent the communicating outlet and inlet openings, a relatively light normally closed poppet having an abutting portion disposed in fluid-tight engagement solely with the deformable valve seat member for effecting variable deformation of the seat member, means on the poppet for positioning the poppet with respect to the deformable valve seat, said means on the poppet including a portion for minimizing fluid turbulence through the flow control valve, resilient biasing means positioned in the passage means of one of the valve body elements to maintain the poppet in normally closed relationship with respect to the deformable valve seat member and permit the poppet to open at a threshold pressure to achieve free flow, limit means to control the maximum degree of deformation of said deformable valve seat member, said limit means includes a non-deformable member spaced from the valve seat adapted to contact said poppet upon a predetermined deformation of said valve seat member by said poppet, and said non-deformable member comprises a washer element positioned adjacent said deformable valve seat member in confrontation to said poppet for contacting the portion minimizing fluid turbulence.

2. The fluid control device of claim 1 wherein said washer element contacts said means for positioning the poppet upon predetermined deformation of said valve seat member.

3. The control valve of claim 1 wherein the first valve body element is threaded in fluid-tight engagement with the second valve body element and the deformable valve seat member is clamped simultaneously with the threading of the body elements between the first and second valve body elements.

4. The control valve of claim 3 wherein the poppet is disposed in an enlarged passage located between the outlet side of the valve seat and the fluid outlet of the valve passage, and the poppet is formed with a plurality of vanes which serve both to position the poppet in predetermined relationship with respect to the valve seat and to control the flow of fluid past the poppet.

5. The control valve of claim 4 wherein the vanes extend generally radially outwardly from the body portion of the poppet and in spaced relationship.

6. The control valve of claim 1 wherein the first valve body element is threaded in fluid-tight engagement with the second valve body element and the deformable valve seat member is clamped between the first valve body element and a ring member disposed adjacent an opposing wall of the second valve body element.

7. A fluid flow control valve for permitting free fluid flow in one direction at a threshold pressure and for stopping return flow in the opposite direction comprising a first valve body element having a passage means therethrough, the passage means having a fluid inlet opening and a fluid outlet opening, a second valve body element having a passage therethrough, the passage means of said second valve body element having a fluid outlet opening and a fluid inlet opening, means for securing the first valve body element to the second body element in fluid tight engagement, the fluid outlet opening of one of the body elements being disposed adjacent to and in communication with the fluid inlet opening of the other body element to provide a substantially continuous fluid flow passage therethrough, a deformable valve seat member having a fluid flow passage therethrough secured between the valve body elements adjacent the communicating outlet and inlet openings, a relatively light normally closed poppet having an abutting portion disposed in fluid-tight engagement solely with an area of the deformable valve seat member for effecting variable deformation of the seat member, means on the poppet for positioning the poppet with respect to the deformable valve seat, said means on the poppet including a portion for minimizing fluid turbulence through the flow control valve, resilient biasing means positioned in the passage means of one of the valve body elements to maintain the poppet in normally closed relationship with respect to the deformable valve seat member and permit the poppet to open at a threshold pressure to permit free flow, and the portion of the poppet adapted to engage the valve seat is formed with a concave portion facing the upstream side of the valve passage connected by a generally continuous rounded portion having a predetermined radius, the area of the valve seat engaged by the poppet having a predetermined concave radius adapted to establish a line contact with the poppet at a selected range of pressure and to establish curvature contact at pressures greater than the selected range.

* * * * *

UNITED STATES PATENT OFFICE
CERTIFICATE OF CORRECTION

Patent No. 3,811,470     Dated May 21, 1974

Inventor(s) John W. Schaefer

It is certified that error appears in the above-identified patent and that said Letters Patent are hereby corrected as shown below:

Column 1, line 49, "open which" should read -- difficulty --.

Signed and sealed this 24th day of September 1974.

(SEAL)
Attest:

McCOY M. GIBSON JR.
Attesting Officer

C. MARSHALL DANN
Commissioner of Patents